(12) United States Patent
Hinnant, Jr. et al.

(10) Patent No.: US 7,307,585 B2
(45) Date of Patent: Dec. 11, 2007

(54) INTEGRATED AEROELASTICITY MEASUREMENT SYSTEM

(75) Inventors: Harris O. Hinnant, Jr., Seattle, WA (US); Darin W. Brekke, Fox Island, WA (US); Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 11/264,707

(22) Filed: Nov. 1, 2005

(65) Prior Publication Data

US 2007/0096979 A1   May 3, 2007

(51) Int. Cl.
  *G01S 5/14* (2006.01)
(52) U.S. Cl. .................................. 342/357.06
(58) Field of Classification Search ........... 342/357.01, 342/357.02, 357.06, 357.12; 701/213, 215
See application file for complete search history.

(56) References Cited

U.S. PATENT DOCUMENTS

| | | | |
|---|---|---|---|
| 4,688,934 A | 8/1987 | Clark | |
| 6,195,615 B1 | 2/2001 | Lysen | |
| 7,131,611 B2 * | 11/2006 | Ferman | 244/39 |
| 2006/0022085 A1 * | 2/2006 | Ferman | 244/45 R |

* cited by examiner

*Primary Examiner*—Dao Phan
(74) *Attorney, Agent, or Firm*—Ingrassia Fisher & Lorenz, P.C.

(57) ABSTRACT

An aircraft aeroelasticity measurement system according to the invention can be used to perform in-flight wing twist measurements of an aircraft or any moving vehicle or structure on which its sensors can be mounted. The system includes a centralized processing unit, a reference navigation unit mounted in the aircraft body, a plurality of measurement navigation units mounted in the aircraft wings, and a global positioning system ("GPS") receiver that generates GPS data for enhancing the accuracy of the navigation data. The system collects navigation data from the reference navigation unit and the measurement navigation units, generates navigation solutions from the navigation data, and performs a stochastic alignment and flexure estimation procedure to generate a corrected measurement solution that indicates the aeroelasticity of the aircraft. Wing twist and wing deflection information can be derived from the corrected measurement solution.

21 Claims, 3 Drawing Sheets

INTEGRATED AEROELASTICITY MEASUREMENT SYSTEM

TECHNICAL FIELD

The present invention relates generally to aircraft diagnostic measurement systems. More particularly, the present invention relates to an in-flight aeroelasticity measurement system suitable for use in measuring wing twist and wing deflection of an aircraft or any moving vehicle or structure to which its sensors can be mounted.

BACKGROUND

Aircraft are designed using wing models and computer systems that simulate the aerodynamic properties and characteristics of the wing. For example, a wing model can be used to design a wing for minimum drag for the intended operating conditions. In practice, wing models must be validated with in-flight tests before the aircraft design is accepted for purposes of a deployable build. Such in-flight tests typically include aeroelasticity measurements for the wings and fuselage.

Wing aeroelasticity data usually includes wing twist data and wing deflection data, where wing twist represents axial rotation of the wing about the wing chord line (which can be visualized as the longitudinal axis of the wingspan) and wind deflection represents bending of the wing in a direction that is perpendicular to the wing chord line. Such aeroelasticity data is collected during flight, and under various flight conditions. In-flight measurements are important because the aeroelasticity of an aircraft wing can vary with the amount of fuel stored in the wing. In-flight aeroelasticity data should be collected in a non-intrusive manner and with enough accuracy to be useful. For example, mounting a sensor or an antenna on a surface of a wing that would otherwise be void of projections is disruptive to the system under test. The desired accuracy is difficult to obtain without imposing requirements for occasional maneuvers or other intrusive constraints.

Conventional aeroelasticity measurement systems may require photogrammetry, a wing-mounted global positioning system ("GPS"), inertial measurement techniques, and/or a significant amount of post-processing of data collected during flight. Unfortunately, photogrammetry is intrusive and is subject to variations in accuracy and availability due to weather. Inertial measurement units, while potentially very accurate, require precision mounting on the aircraft. Moreover, a GPS requires an antenna at the desired measurement point, which is intrusive because it may be difficult or impossible to properly mount the GPS antenna in the desired location (for example, in the interior space of the wing).

Accordingly, it is desirable to have an integrated system for the collection and analysis of in-flight aeroelasticity data. In addition, it is desirable to have an integrated aeroelasticity measurement system that processes test data in substantially real time without having to rely on post-processing of measured data. Furthermore, other desirable features and characteristics of the present invention will become apparent from the subsequent detailed description and the appended claims, taken in conjunction with the accompanying drawings and the foregoing technical field and background.

BRIEF SUMMARY

A system and method is provided for the measurement of elasticity of an airframe, ship, any air, land, or water vehicle, or in general the relative motion of any moving structure. The system and method can be used to validate aerodynamic performance models such as wing models (to reduce wing drag). The, system and method can also be used to validate the need for inertial stabilization of antenna arrays on elastic bodies. An example embodiment of the invention utilizes inertial sensors, a GPS receiver, inertial navigation techniques, and stochastic alignment and flexure estimation techniques integrated into a configurable system controlled by a single processor. The system can also be suitably configured to assist in the accurate mounting of sensors at the measurement points of interest.

The above and other aspects of the invention may be carried out in one form by a system for measuring aeroelasticity of an aircraft component. The system includes a reference navigation unit configured to generate reference navigation data for a reference location on the aircraft, a measurement navigation unit configured to generate measurement navigation data for a measurement location on the aircraft, and a processing unit coupled to the reference navigation unit and to the measurement navigation unit. The processing unit is configured to generate a reference navigation solution based upon the reference navigation data, to generate a measurement navigation solution based upon the measurement navigation data, and to perform stochastic alignment and flexure estimation of the measurement navigation solution with respect to the reference navigation solution to obtain a corrected measurement solution that indicates aeroelasticity of the measurement location relative to the reference location.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
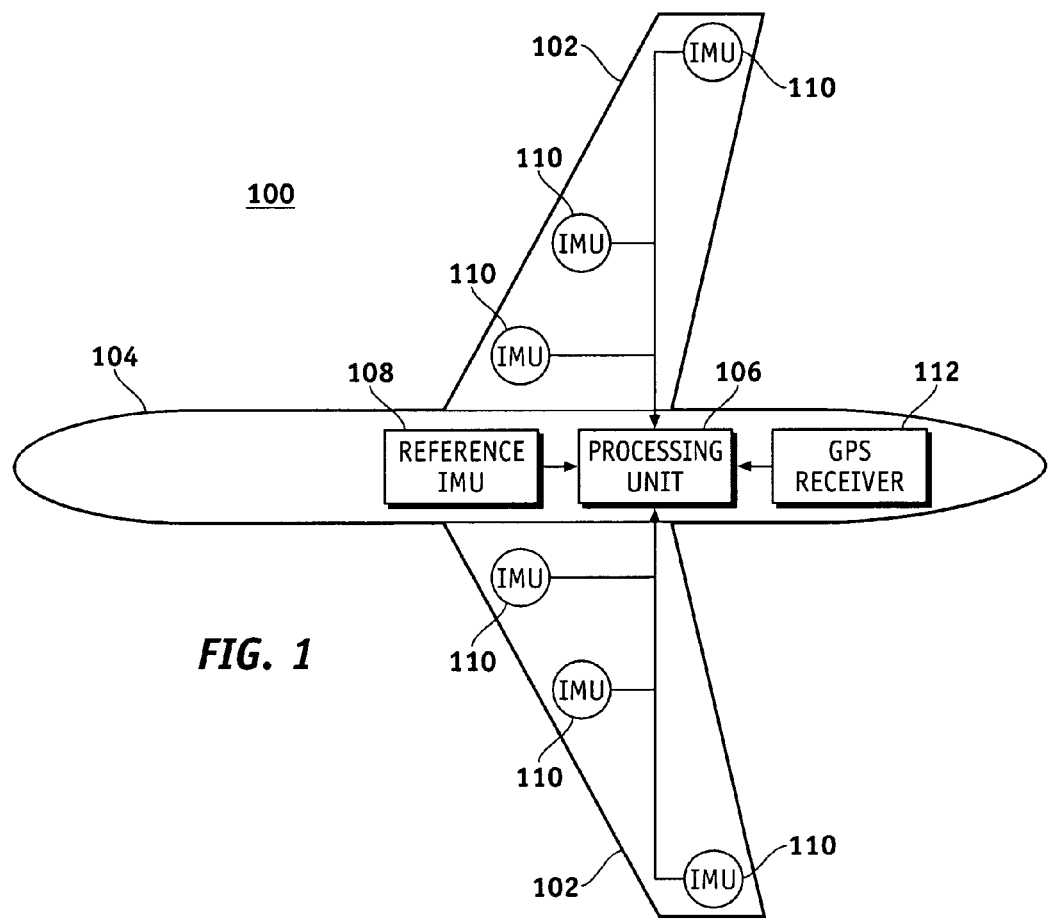
FIG. 1 is a simplified schematic representation of an aircraft having an integrated system for measuring aeroelasticity of the aircraft wings.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of structures and that the aircraft wing aeroelasticity measurement system described herein is merely one exemplary application for the invention.

For the sake of brevity, conventional techniques related to inertial measurement sensors, GPS systems, navigation systems, navigation and position signal processing, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to components or features being "connected" or "coupled" together. As used herein, unless expressly stated otherwise, "connected" means that one component/feature is directly joined to (or directly communicates with) another component/feature, and not necessarily mechanically. Likewise, unless expressly stated otherwise, "coupled" means that one component/feature is directly or indirectly joined to (or directly or indirectly communicates with) another component/feature, and not necessarily mechanically. Thus, although the figures may depict example arrangements of elements, additional intervening elements, devices, features, or components may be present in an actual embodiment (assuming that the functionality of the system is not adversely affected).

As used herein, a "navigation solution" refers to the position, velocity, and attitude of a measured point, relative to one or more reference axes, or relative to the earth.

As used herein, a "navigation trajectory" refers to the position, velocity, and attitude of a measured point, relative to one or more reference axes, over a period of time. A navigation trajectory can be derived from a history of navigation solutions.

An integrated aeroelasticity measurement system configured in accordance with the invention employs a single processor to collect data from measurement navigation units, such as inertial measurement units ("IMUs"), located at various measurement points of interest on an aircraft wing. The system also collects data from a reference IMU, which is preferably located in the aircraft fuselage. The reference IMU is treated as a fixed reference point that is not subject to twisting, bending, or displacement during flight. The example system also collects data from a GPS receiver that is capable of tracking the Wide Area Augmentation System ("WAAS") for performance augmentation of the GPS measurements. The WAAS is one of a variety of means by which the GPS receiver solution can be augmented; any suitable technique would suffice in this application. The GPS receiver and antenna are located proximate to the reference IMU and the receiver navigation solution, measured at the antenna, is also treated as a fixed reference point, providing a navigation position and velocity solution that is integrated with that of the reference IMU.

The measurement technique described in more detail herein applies aided inertial navigation and stochastic alignment and flexure estimation algorithms that are typically used in aircraft navigation and weapon system navigation initialization. These algorithms are implemented in a unique and integrated manner that takes advantage of features typically used for other purposes and/or features that may otherwise be unused due to system bandwidth limitations.

In practice, the measurement system produces separate estimates of both static and dynamic misalignment and flexure between the reference IMU and the wing-mounted IMUs. In addition, the measurement system can estimate misalignment between the wing-mounted IMUs themselves. The static estimates provide the capability to aid in precision mounting of the inertial sensors by taking advantage of the lack of motion to process data at a higher rate relative to the in-flight data processing rate. So doing, the measurement system is able to make its estimates in the low motion environment on the ground, requiring only a rotation or taxi of the aircraft to get estimates in all three aircraft body axes.

Using the techniques described herein, the measurement system takes a problem usually solved by sensor experts (inertial sensors, photogrammetric sensors, etc.) and engineers skilled in estimation techniques, and makes its solution accessible to those unskilled in these fields. Historically, these kinds of measurements required the involvement of specialists, special software, hardware and algorithms usually directed and generated for the specific case at hand and then not used again. In contrast, the measurement system described herein integrates complex algorithms and techniques into a package that can be used by test engineers not skilled in those fields to produce reliable results on a variety of platforms without the degree of specialized work that has traditionally been necessary. In addition, the measurement system produces estimates of measurement accuracy not typically available in previous work.

Figure 2:
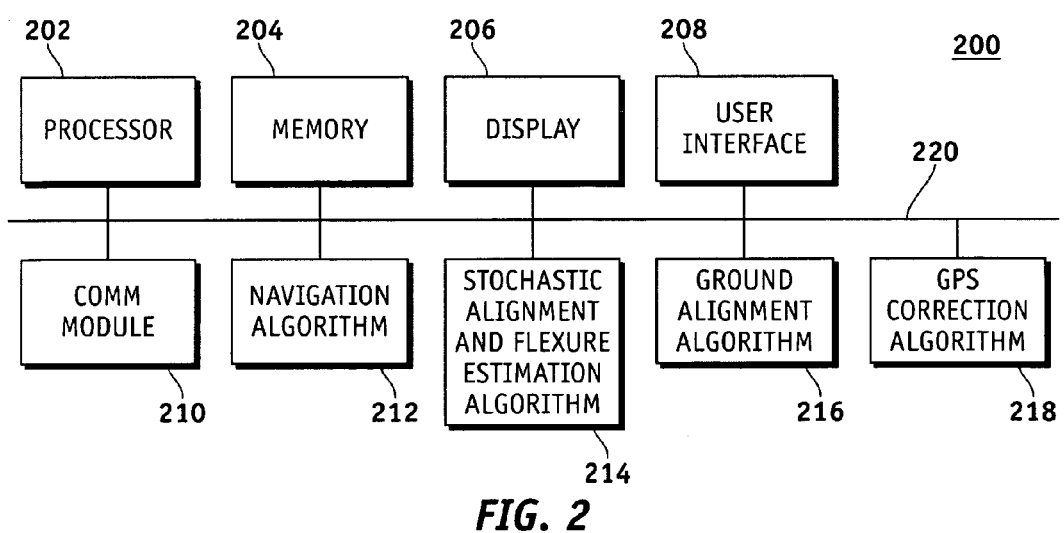
FIG. 2 is a schematic representation of a processing unit suitable for use with an aeroelasticity measurement system as described herein.

FIG. 1 is a simplified schematic representation of an aircraft 100 having an integrated system for measuring aeroelasticity of the aircraft wings 102, and FIG. 2 is a schematic representation of a processing unit 200 suitable for use with an aeroelasticity measurement system as described herein. The various illustrative blocks, modules, processing logic, and circuits described in connection with processing unit 200 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Referring to FIG. 1, aircraft 100 generally includes a body 104 and wings 102 attached to body 104. During flight, wings 102 may deflect and/or twist relative to their respective chord lines (as mentioned above). The amount of deflection and twist may vary during flight depending upon various factors such as airspeed, weather conditions, the volume of fuel in wings 102, loading of aircraft 100, the flight path of aircraft 100, and the like. The aeroelasticity measurement system described herein is a diagnostic system that can be installed in aircraft 100 to collect in-flight test data and subsequently removed from aircraft 100 upon completion of the testing. The example aeroelasticity measurement system shown in FIG. 1 generally includes a processing unit 106, a reference navigation unit 108 coupled to processing unit 106, a plurality of measurement navigation units 110 coupled to processing unit 106, and a GPS receiver 112 coupled to processing unit 106. A practical embodiment may include any number of measurement navigation units 110 located throughout aircraft 100, and the location of such measurement navigation units 100 need not be restricted to wings 102.

Processing unit 106, which is described in more detail below in connection with FIG. 2, functions as a centralized data collection point and an integrated data processing component for the aeroelasticity measurement system. Briefly, processing unit 106 is suitably configured to collect navigation data from reference navigation unit 108 and from measurement navigation units 110, compute a reference navigation solution, compute measurement navigation solutions, and resolve wing twist and/or wing deflection from the navigation solutions, in a centralized and real-time manner that need not require post processing of the navigation data. In practice, processing unit 106 may be realized as a general purpose computing device, such as a personal computer having sufficient memory capacity, processing power and speed, hard drive storage space, user interface devices, and graphics capabilities. Processing unit 106 may utilize a laptop computer and/or any portable computing device that can be conveniently installed in, and removed from, aircraft 100. Alternatively, processing unit 106 may be incorporated into an aircraft-mounted computing device or processing system of aircraft 100.

Reference navigation unit 108 is coupled to processing unit 106 via any suitable data connection. In the example embodiment, reference navigation unit 108 is coupled to processing unit 106 via a serial data connection (such as an RS-422 compliant connection). In operation, reference navigation unit 108 generates reference navigation data for a reference location on aircraft 100. In the example embodiment where wing twist and deflection is measured, reference navigation unit 108 is mounted in body 104 of aircraft 100 and is treated as a fixed reference point. In other words, the reference location corresponding to the reference navigation data is a location in body 104. When deployed, reference navigation unit 108 is mounted in a suitable manner such that its housing does not move relative to the reference point of aircraft 100. In other words, reference navigation unit 108 facilitates "strapdown" navigation (in contrast to a navigation component mounted to a gimbal).

In one practical embodiment, the reference navigation data includes measured angle change and measured velocity change for a plurality of axes. In particular, reference navigation unit 108 may be realized as an IMU having three orthogonal axes corresponding to three sensitive directions. An example IMU employs a combination of gyros and accelerometers to measure angle and velocity change over an interval of time (usually 10 milliseconds or less). Typically, an IMU provides three-axis measurements taken from an orthogonal triad of gyros and accelerometers. This is accomplished by sampling the inertial instruments at a designated rate (for example, 1000 Hz or higher) and applying compensations for non-commutativity to accumulate and provide the data at a lower rate. Non-commutativity refers to the fact that the order of the angle and velocity change is not commutative and also not known over the interval of measurement. In practice, the aeroelasticity measurement system may utilize any suitable IMU technology, and the specific operation of IMUs will not be described in detail herein.

Using IMU technologies, therefore, reference navigation unit 108 is capable of measuring movement and velocity of the reference location relative to the three axes. Reference navigation unit 108 may sample or obtain the reference navigation data at a specified rate, and processing unit 106 may receive the sampled reference navigation data at the same rate. For example, reference navigation unit 108 may be configured to read the reference navigation data at a rate of 100 Hz.

If reference navigation unit 108 is realized as a practical IMU, then the accuracy of the navigation data may drift over time (even though the IMU is very accurate over short periods of time). In contrast, the accuracy of GPS data does not drift over time, however, each individual GPS reading may not be very precise. The example aeroelasticity measurement system takes advantage of the long term stability of GPS systems and utilizes GPS data to improve the accuracy of the reference navigation solution and the reference trajectory derived from the reference navigation data. As depicted in FIG. 1, GPS receiver 112 may be coupled to processing unit 106 using a suitable interface, such as an RS-422 serial data connection. In the example embodiment, GPS receiver 112 is configured to provide GPS data for the reference location. Consequently, the antenna for GPS receiver 112 is preferably located near to reference navigation unit 108. In practical embodiments, GPS receiver 112 can be a civilian grade commercial GPS receiver having access to WAAS correction data or other means of enhancing the receiver solution; or it may rely on the standalone receiver solution alone.

Processing unit 106 receives the GPS data from GPS receiver 112, along with the reference navigation data from reference navigation unit 108, and processes the GPS data and the reference navigation data in an appropriate manner to generate a reference navigation solution that includes accurate position, velocity, and attitude data for the reference location. In this regard, processing unit 106 generates the reference navigation solution based upon the reference navigation data and based upon the GPS data. In practice, processing unit 106 generates reference navigation solutions at the same rate at which the reference navigation data is sampled (100 Hz in this example). Both measurement and reference navigation solutions are integrated over time, according to the frames of IMU data received. There is a navigation solution for each new frame of IMU data; the integration of these data frames according to strapdown navigation techniques results in a new navigation solution current at the time of validity of the latest frame of data.

Reference navigation unit 108, GPS receiver 112, and processing unit 106 function as a reference system for the aeroelasticity measurement system, where the reference system obtains a reference trajectory that tracks the reference location during the flight test. Ultimately, wing twist and wing deflection is measured relative to the reference trajectory, which represents the position, velocity, and attitude of reference navigation unit 108 over time. Processing unit 106 receives the raw reference navigation data from reference navigation unit 108, and integrates the reference navigation data to generate the reference navigation solution. The GPS data is used to keep the reference trajectory accurate. In the example embodiment, the reference navigation solution is generated using a Kalman filter algorithm to estimate the best state of the navigation system based on both inertial and GPS data. The inertial data is accurate over the short term, while the GPS data is reliably accurate (but noisy) over the long term and does not provide attitude data. The Kalman filter takes measurements from both sources and produces the best estimate of the navigation state.

Each measurement navigation unit 110 is coupled to processing unit 106 via any suitable data connection. In the example embodiment, each measurement navigation unit 110 is coupled to processing unit 106 via a serial data connection (such as an RS-422 compliant connection). In operation, each measurement navigation unit 110 generates measurement navigation data for a measurement location on aircraft 100. In the example embodiment where wing twist and deflection is measured, each measurement navigation unit 110 is mounted in the wings 102 of aircraft 100. For example, each measurement navigation unit 110 may be installed in a pocket or other suitable location within the interior space of the wings 102. Each measurement navigation unit 110 is mounted in a suitable manner such that its housing does not move relative to the respective measurement point of aircraft 100. In other words, the measurement navigation units 110 facilitate "strapdown" navigation for the aeroelasticity measurement system.

In the example embodiment, the measurement navigation data includes measured angle change and measured velocity change for a plurality of axes. In particular, each measurement navigation unit 110 may be realized as an IMU having three orthogonal axes corresponding to three sensitive directions. The IMU hardware utilized for measurement navigation units 110 may be the same as the IMU hardware utilized for reference navigation unit 108 (described above). Each measurement navigation unit 110 is capable of measuring movement and velocity of its respective measurement location relative to the three axes. Each measurement navigation unit 110 may sample or obtain its measurement navigation data at a specified rate, and processing unit 106 may receive the sampled measurement navigation data at the same rate. For example, each measurement navigation unit 110 may be configured to read the measurement navigation data at a rate of 100 Hz. In a practical embodiment, the IMU samples its inertial instruments to obtain data on angle and velocity change of the unit over an interval of time that is then reported out to the navigator (reference or measurement unit). The processing unit implements the reference and measurement navigators in its computer code and collects the frames of IMU data as they become available. A frame of IMU data includes the angle and velocity change measured over the output interval (e.g., 10 milliseconds for a 100 Hz unit).

Processing unit 106 is suitably configured to obtain the measurement navigation data from measurement navigation units 110 and to generate measurement navigation solutions for the respective measurement locations. Each measurement navigation solution is based upon the measurement navigation data for the particular measurement location, and each measurement navigation solution includes position, velocity, and attitude information for the respective measurement location. Thus, the example shown in FIG. 1 would generate six measurement navigation solutions—one for each wing-mounted measurement IMU. The generation of the measurement navigation solutions is similar to the generation of the reference navigation solution described above in connection with the reference system. In practice, processing unit 106 generates measurement navigation solutions at the same rate at which the measurement navigation data is sampled (100 Hz in this example). Again, the difference between the reference and measurement navigators is that the reference navigator keeps itself stable and accurate using GPS measurements while the measurement navigator keeps itself stable and accurate using the reference navigation state. The measurement navigator and Kalman filter processing serves to keep the measurement navigator aligned to the reference and estimate the current difference (attitude and flexure) between the two.

Processing unit 106 is also configured to derive a corrected measurement solution from the reference navigation solution and the measurement navigation solutions. The corrected measurement solution indicates aeroelasticity of the measurement locations relative to the reference location. In the example embodiment described herein, processing unit 106 performs stochastic alignment and flexure estimation on the reference navigation solution and the measurement navigation solutions to obtain the corrected measurement solution. In practice, the corrected measurement solution represents the best estimate of the navigation state at the measurement IMU. The measurement Kalman filter estimates the attitude and flexure between the two, allowing the measurement unit to update itself (correct its drift) based on the reference solution. This corresponds to the wing twist and flexure estimate, and is the means by which the measurement navigation solution is related to the reference solution. Processing unit 106 may be configured to generate the corrected measurement solution at a rate that differs from the data sampling rate. The corrected measurement solution and the aeroelasticity estimate may be generated at a rate that is less than the IMU data sampling rate (generated at 10 Hz in the example embodiment where the navigation data is sampled at 100 Hz). Furthermore, processing unit 106 may be configured to resolve wing twist and/or wing deflection from the corrected measurement solution via the mechanism of a stochastic alignment and flexure estimation algorithm. In a practical deployment, the wing twist and/or wing deflection information can be provided to an operator in any suitable format, e.g., a graphical display, a printed report, disk file, or the like. The information may also be sent to another computing device or system in any suitable electronic format via TCP/IP, ARINC 429, or other network protocol.

FIG. 2 is a schematic representation of processing unit 200, which may be suitable for use with an aeroelasticity measurement system as described herein. Processing unit 200 generally includes a processor or controller 202, memory 204, a display element 206, one or more user interface components 208, a communication module 210, a navigation algorithm 212, a stochastic alignment and flexure estimation algorithm 214, a ground alignment algorithm 216, and a GPS correction algorithm 218. Processing unit 200 may also include a number of conventional hardware, software, firmware, or logical elements found in general purpose computing architectures (not shown). These elements may be coupled together or otherwise able to communicate with each other via a bus 220 or any suitable interconnection architecture to support the functionality of processing unit 200. In an actual deployment, communication module 210, navigation algorithm 212, stochastic alignment and flexure estimation algorithm 214, ground alignment algorithm 216, and GPS correction algorithm 218 (or portions thereof) are realized as processing logic or logical elements, and such processing logic may be realized as one or more pieces of software/firmware. For example, the processing algorithms may be implemented in a software application executed by processor 202.

Display element 206 conveys visual information to the user under the control of processor 202. In practice, display element 206 may be realized as a conventional computer monitor or laptop computer display screen. Display element 206 can be used to display the aeroelasticity measurement test results to the operator. Processing unit 200 may also include user interface component(s) 208 that accommodates user inputs and/or conveys audible or tactile information to the user under the control of processor 202. For example, user interface components 208 may include, without limitation: a keyboard, a mouse or other pointing device, a touchpad, or the like.

Communication module 210 is suitably configured to manage data communication with the reference navigation unit and the measurement navigation units in accordance with at least one data communication protocol. In the example embodiment, communication module 210 provides a serial data interface for processing unit 200. Of course, communication module 210 may be configured to support any number of standardized data communication protocols such as, without limitation: RS-422; Bluetooth; IEEE 802.11 (any variation thereof); Ethernet; IEEE 1394 (Firewire); GPRS; USB; IEEE 802.15.4 (ZigBee); or IrDA (infrared). Communication module 210 may be realized with hardware, software, and/or firmware using known techniques and technologies.

Navigation algorithm 212, stochastic alignment and flexure estimation algorithm 214, ground alignment algorithm 216, and GPS correction algorithm 218 represent procedures and techniques executed by processing unit 200 while performing aeroelasticity measurements as described herein. These logical elements enable processing unit 200 to collect test data and process the test data in real-time without having to rely on post-processing techniques. These elements and algorithms are described in more detail below.

Figure 3:
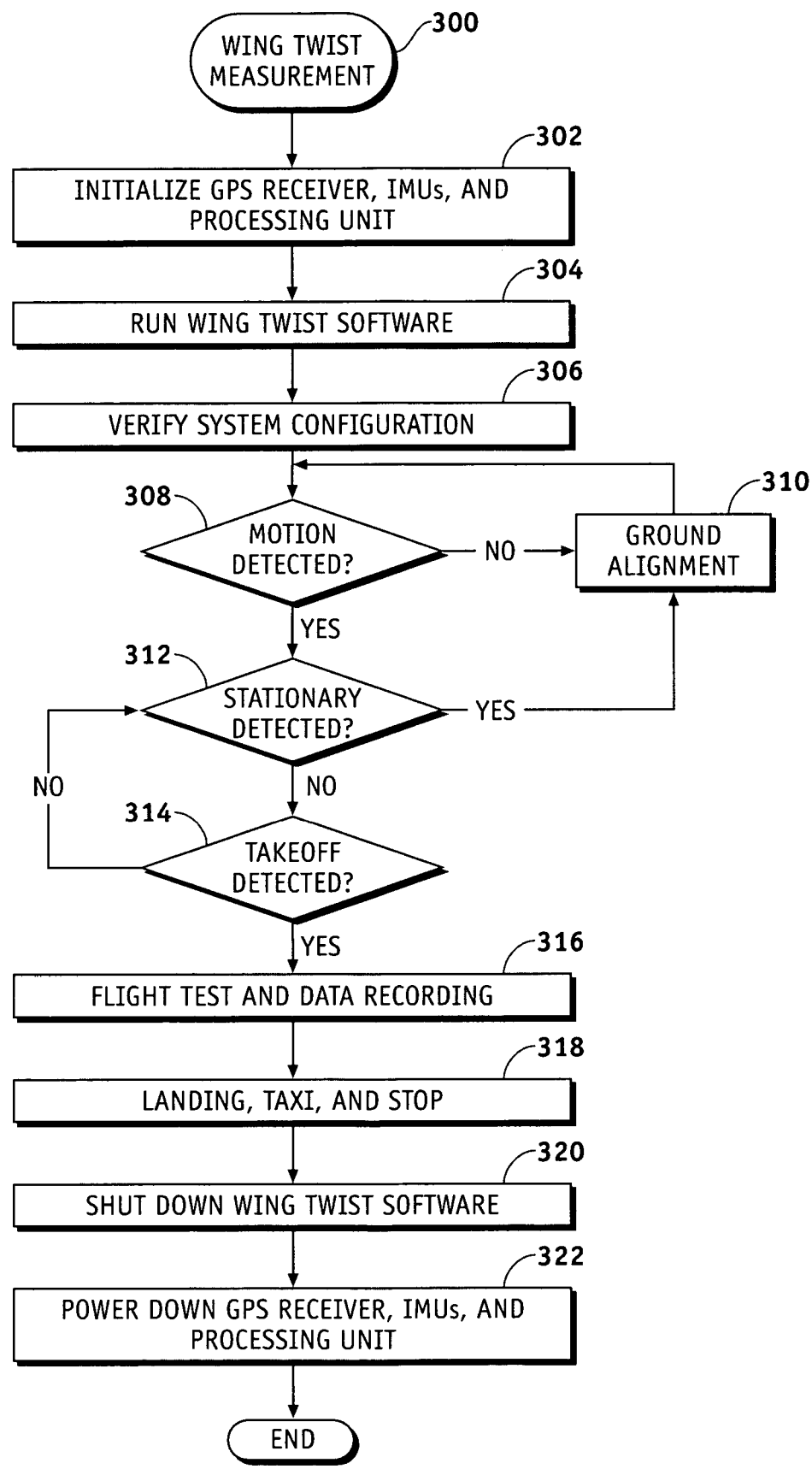
FIG. 3 is a flow chart of an example wing twist measurement process that may be performed by an aeroelasticity measurement system as described herein.
Figure 4:
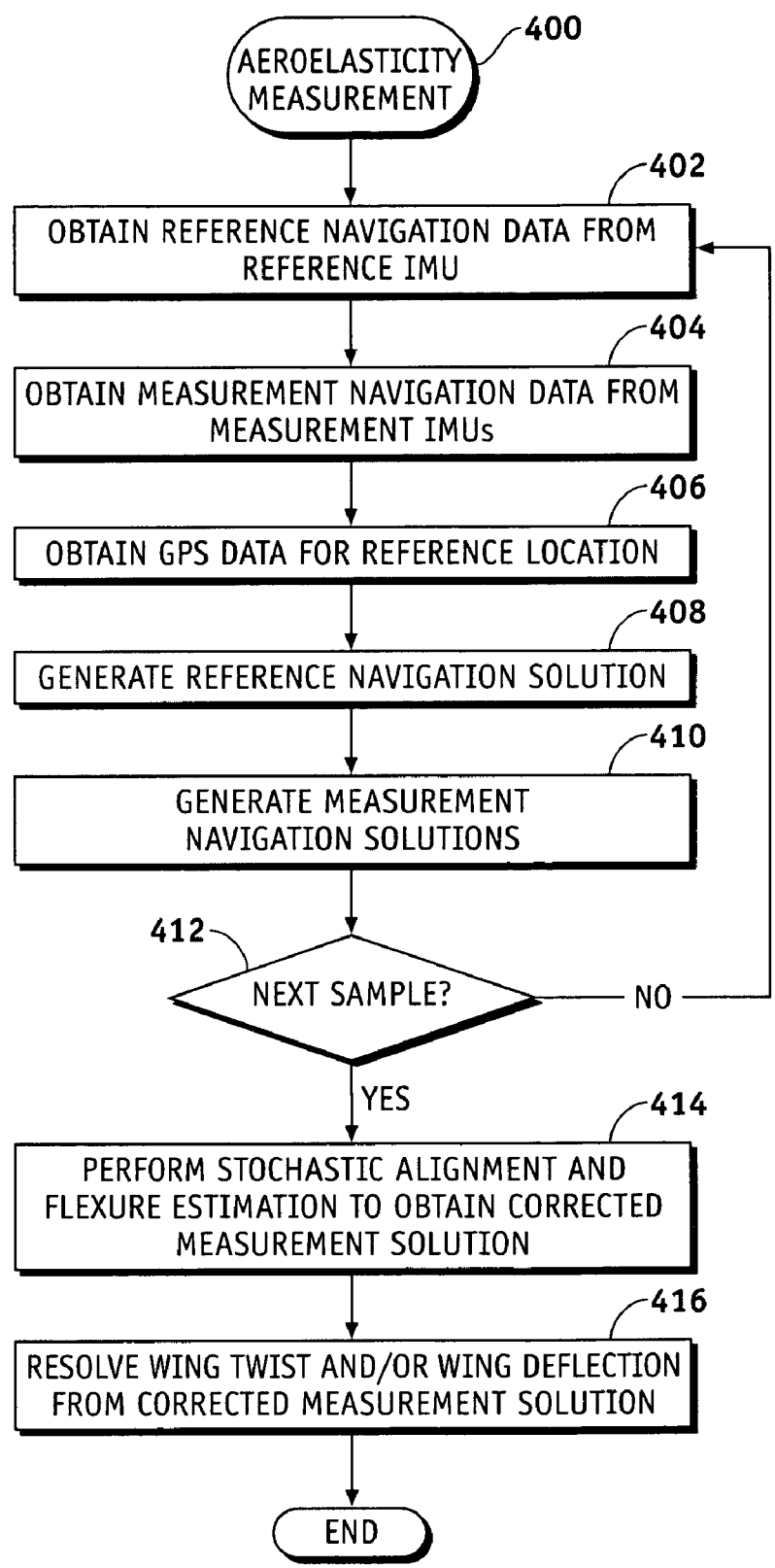
FIG. 4 is a flow chart of an example aeroelasticity measurement process that may be performed by an aeroelasticity measurement system as described herein.

FIG. 3 is a flow chart of an example wing twist measurement process 300 that may be performed by an aeroelasticity measurement system as described herein, and FIG. 4 is a flow chart of an example aeroelasticity measurement process 400 that may be performed by an aeroelasticity measurement system as described herein. Process 400 may be incorporated into process 300 for execution as described in more detail below. The various tasks performed in connection with process 300 and process 400 may be performed by software, hardware, firmware, or any combination thereof. For illustrative purposes, the following description of process 300 and process 400 may refer to elements mentioned above in connection with FIG. 1 and FIG. 2. In practical embodiments, portions of process 300 or process 400 may be performed by different elements of the described system, e.g., processing unit 106, reference navigation unit 108, measurement navigation units 110, or GPS receiver 112. It should be appreciated that process 300 (and/or process 400) may include any number of additional or alternative tasks, the tasks shown in FIG. 3 and FIG. 4 need not be performed in the illustrated order, and process 300 (and/or process 400) may be incorporated into a more comprehensive procedure or process having additional functionality not described in detail herein.

The steps of a method or algorithm described in connection with the embodiments disclosed herein may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. In the alternative, the storage medium may be integral to the processor. As an example, the processor and the storage medium may reside in an ASIC. In a practical embodiment, these elements and components may reside at, or communicate with, processing unit 106.

The example measurement system utilizes strapdown navigation at 100 Hz, a GPS/inertial Kalman filter and a low-motion alignment Kalman filter. The reference IMU drives a GPS/inertial navigator from which a free inertial solution is also derived. The measurement IMUs each drive a strapdown navigator that is continually aligned to the reference IMU via the low-motion alignment algorithm. The three-axis wing twist and wing displacement data can be displayed and recorded for at least two measurement IMus. The actual number of wing-mounted measurement IMUs can vary to suit the needs of the given application, and a practical measurement system can handle as many measurement IMUs as the processor can sustain.

Referring to FIG. 3, wing twist measurement process 300 represents an example flight test procedure for obtaining wing twist and/or wing deflection data. Process 300 assumes that an integrated aeroelasticity measurement system as described above is installed in the aircraft under test. In other words, a reference IMU is mounted in a suitable location in the aircraft body, a plurality of measurement IMUs are mounted in suitable locations in the aircraft wings, a GPS receiver is mounted in a suitable location in the aircraft body, and a processing unit (having the necessary processing capabilities) is coupled to the respective system components to receive reference navigation data, measurement navigation data, and GPS data. In a practical embodiment, the measurement system may support a precision mounting mode that is utilized to assist in the mounting of the measurement IMUs in the aircraft wings. The mounting procedure eliminates the need to perform optical alignment procedures. Briefly, the precision mounting procedure records the static alignment of the measurement IMUs relative to the reference IMU, along with the orientation of the measurement IMUs relative to the reference IMU (due to the directional nature of the IMUs). This mounting procedure obtains the roll, pitch, and yaw of the measurement IMUs relative to the reference IMU. The mounting procedure also enables translation of the measurement IMU data to respective modeled measurement points, which in turn facilitates the computation of wing twist and wing deflection relative to designated reference points or lines on the aircraft (e.g., the chord line of the wings).

Wing twist measurement process 300 may begin by initializing the GPS receiver, the IMUs, and the processing unit (task 302). The hardware components are powered up during task 302, which may be performed by an operator. In response to task 302, the GPS receiver begins the tracking process and the IMUs begin to output their respective navigation data at a specified rate (100 Hz in the example embodiment described above). After system initialization, the operator can run the wing twist software (task 304), which may prompt the operator to confirm or verify the system configuration (task 306). The system configuration refers to the number of measurement IMUs deployed, the types of IMUs deployed, the accuracy of the system components, and the like. The system is ready to take measurements after the system configuration has been verified.

The system may test whether the aircraft is in motion (query task 308). In a practical embodiment, "motion" may refer to a specified velocity or movement threshold. For example, "motion" may be defined as three feet of movement in one second as determined by a moving window sum of absolute values of raw delta velocity readings from which gravity is removed. Moreover, once motion has been detected, "stationary" may be defined in terms of another velocity or movement threshold. For example, "stationary" may be defined as motion of less than one foot in one second.

If motion is not detected by query task 308, then wing twist measurement process 300 may perform a suitable ground alignment procedure (task 310) to determine the position and attitude of the reference IMU. Ground alignment algorithm 216 (see FIG. 2) may be executed during task 310. Ground alignment algorithm 216 compares the reference navigation solution to zero velocity and, due to rotation of the earth and the effect of gravity, ground alignment algorithm 216 can determine the orientation of the aircraft relative to true north. In practice, the ground alignment procedure is only applicable to the reference trajectory. In one example embodiment, the reference IMU begins ground alignment in an altitude-hold mode (since no air data is available, and until GPS altitude data is available), based upon the last available position and heading. During the ground alignment procedure, the reference IMU employs a 1 Hz zero velocity update rate in an altitude-hold mode (based on initial altitude) until the GPS receiver provides an altitude reference, after which the GPS altitude is used to damp the vertical axis. When the first GPS fix is available, a position check is made and ground alignment restarts with a new position if there is a significant latitude change.

If, however, motion is detected by query task 308 (e.g., at least three feet in one second), then wing twist measurement process 300 exits the ground alignment mode and the reference IMU enters the free inertial mode. The free inertial mode refers to the processing of the reference navigation data to generate the reference navigation solution. In addition, the measurement IMUs can begin continuous alignment to the reference IMU once degraded navigation is ready, using the same initial position and heading. In this context, "degraded navigation" represents the earliest possible time at which the reference navigator can sustain navigation albeit with less accuracy. Normally a full ground alignment process is completed when the estimated navigation error decreases as ground alignment refines the navigation state and the estimated error passes through a threshold value that is typically the specification value for the IMU. That is, a navigation grade IMU is typically capable of 0.8 nautical miles per hour navigation accuracy but this accuracy will only be achieved if the navigator designed around the IMU is properly initialized and aligned. Alignment is a process whose accuracy increases over time as a function of inertial sensor accuracy and the algorithm parameters. As alignment time increases, navigation accuracy increases until it reaches the threshold capability of the IMU and alignment algorithms; the process can take from 30 seconds to 45 minutes to reach the specified accuracy, depending on the initial conditions (for example, if heading and latitude are well known alignment is quick).

Measurement units can begin their navigation and estimation process (at the earliest) when the reference unit has progressed to a degraded navigation state. As the reference unit continues to align and its accuracy estimate continues to decrease (meaning it can navigate more accurately), the measurement units correct themselves accordingly (that is, they receive information on corrections the reference has made to its state and apply these in turn to their own state).

If process 300 subsequently detects a stationary condition (query task 312), then task 310 is re-entered to continue ground alignment. As mentioned above, "stationary" is defined as motion of less than one foot in one second for the example embodiment.

In the example embodiment, the actual in-flight testing does not occur until takeoff is detected (query task 314). In practice, "takeoff" may be defined to be a specific speed threshold. In this regard, the example embodiment defines "takeoff" as an aircraft speed that exceeds 50 knots. When takeoff is detected, the free inertial mode of the reference IMU is assisted with the full compliment of GPS data (as opposed to an altitude update only) to provide a reference trajectory having improved accuracy. GPS correction algorithm 218 may be executed at this time (see FIG. 2). Upon takeoff, wing twist measurement process 300 performs flight testing and data recording as described herein (task 316). During the flight test, an operator may, but need not, monitor and control the measurement system. For example, the operator can view the results in a suitable format on a display. If GPS data is lost for more than a designated period of time (for example, 60 seconds), then the reference IMU may enter an altitude-hold mode to stabilize the vertical channel until GPS data is again available. During the flight test, the system can process and store data indicative of the parameters, quantities, and measurements described herein, including, without limitation: the navigation data, navigation solutions, reference trajectory, wing twist, wing deflection, and/or aircraft aeroelasticity.

During landing and taxi (task 318) the system continues to run in the GPS aided mode. The system may again enter the ground alignment mode when the aircraft stops and a stationary condition is detected. Eventually, the operator shuts down the wing twist software (task 320) and powers down the GPS receiver, the IMUs, and the processing unit (task 322). Prior to shutdown, the software may save the last navigation state unless the operator overrides the save feature. Upon completion of the flight testing, the measurement system components can be removed from the aircraft. Furthermore, the measurement system may support a playback mode for examination of recorded data after completion of the flight test.

Referring to FIG. 4, aeroelasticity measurement process 400 represents one example technique for collecting and processing IMU data from a measurement system as described herein. Process 400 may be performed, for example, during the flight testing portion of wing twist measurement process 300. In practice, process 400 is cyclical at a rate of 10 Hz or more. A cycle involves access to reference unit navigation data over the previous interval (0.1 seconds, for example). A difference is formed between measurement and reference navigation solutions at the end of the interval. The difference is fed to a stochastic alignment and flexure algorithm that estimates the current attitude and flexure between the two units. The measurement navigator is then corrected for the error portion of this estimate, its navigation state reset consistent with the reference unit, and the attitude and flexure estimates are output as the desired aeroelasticity data.

Aeroelasticity measurement process 400 may begin by obtaining reference navigation data from the reference IMU (task 402). In practice, the reference navigation data includes position, velocity, and attitude data indicative of the measured angle change and measured velocity change for the three sensitive axes of the reference IMU. In addition, process 400 obtains measurement navigation data from the measurement IMUs (task 404), which are wing-mounted in the example embodiment described above. As with the reference navigation data, the measurement navigation data includes position, velocity, and attitude data indicative of the measured angle change and measured velocity change for the three sensitive axes of each measurement IMU. As mentioned above, the reference navigation data and the measurement navigation data may be generated at a specified rate, such as 100 Hz in this example.

The preferred embodiment also obtains GPS data for the reference location (task 406) for use in generating the reference trajectory. In this regard, process 400 may generate the reference navigation solution (task 408) by processing the reference navigation data and the GPS data. In practice, the reference navigation solution includes position, velocity, and attitude data for the reference location. The reference navigation solution is generated in two distinct segments (ground and in-flight) from reference IMU inertial and GPS receiver data. At startup, on the ground and stationary, the reference navigation solution is estimated through the ground alignment Kalman filtering process, which may be punctuated by intervals when the plane taxis but does not exceed the 50 knot threshold. The ground alignment process continues as long as the plane is stationary, with the end result being the reference navigator is prepared to navigate at its specification accuracy. During taxi operations of less than 50 knots, the reference navigator is not aligning but navigating using GPS altitude (only) updates to damp the vertical position and velocity. When 50 knots are exceeded, the full compliment of GPS data (3-axis position and velocity) is applied to the Kalman filtering process and thereafter the reference navigator solution is derived from inertial and GPS data blended by the Kalman filter into a single navigation state estimate.

Again, the GPS data provides long term accuracy for the reference navigation solution, while the reference navigation data provides short term accuracy. Process 400 also generates measurement navigation solutions for the respective measurement IMUs (task 410). The measurement navigation solutions are generated by processing the respective measurement navigation data, and each measurement navigation solution includes position, velocity, and attitude data for the given measurement location. The reference navigation solution and the measurement navigation solutions may be generated at a specified rate, such as 100 Hz in this example.

As described above, the aeroelasticity measurement system may collect the measurement data at a first sampling rate (e.g., 100 Hz) and process the measurement data at a second sampling rate (e.g., 10 Hz). At the 10 Hz rate, the processing unit compares the measurement data to the reference data. Thus, if the next data sample is to be processed (query task 412), then process 400 continues. Otherwise, task 402 may be re-entered to enable process 400 to gather data at the 100 Hz rate. In the example embodiment, the processing unit performs a stochastic alignment and flexure estimation procedure on the reference navigation solution and the measurement navigation solutions to obtain corrected measurement solutions for the measurement locations (task 414). Generally, a corrected measurement solution represents the navigation state at the measurement IMU and the estimate of attitude and flexure represents a difference between the reference navigation solution and the respective measurement navigation solution, which is the desired aeroelasticity measurement. The direct difference between reference and measurement units may include contributions from instrument errors, timing errors, wing twist, and wing deflection, but the final estimate produced by the stochastic alignment and flexure algorithm separates these out to indicate aeroelasticity of the respective measurement location relative to the reference location.

In one practical embodiment, task 414 applies Kalman filtering to the reference navigation solution and the measurement navigation solution to obtain the corrected measurement solutions. Kalman filters and Kalman filtering techniques are generally known to those skilled in the art and, therefore, such techniques will not be described in detail herein. Briefly, a Kalman filter is a stochastic algorithm that takes measurements, complete or partial, of a system state and produces from all the measurements the best estimate of system state including the errors in the system. The algorithm contains state equations which comprehensively render the system into a math model that includes system errors, measurement errors and state transition equations. The algorithm retains a memory (so to speak) of past events in its covariance matrix, which is propagated in time and updated according to the information in each measurement made on the system state. After a period of time the Kalman filter estimate will contain information on the system errors that improves the system state estimate over the quality that could be obtained from any combination of the measurements alone.

For example, the navigation state includes position, velocity and attitude at any given time. The IMU provides a measure of angle and velocity change over small time intervals. These data can be integrated to yield position, velocity, and attitude but this is accurate primarily in the short term and suffers from drift errors in the inertial instruments that cause an ever increasing error in the navigation solution to the point it would be useless for realistic applications after a period of time (how much time is a function of instrument accuracy). The GPS receiver provides a position and velocity (but not attitude) solution valid at its antenna location that is consistently over time accurate but subject to small errors that act as noise rather than drift. Measurements from an IMU and a GPS receiver can be combined in a Kalman filter that models the errors, which are well known and mathematically characterized, estimates them, and removes their effect to produce the best statistical estimate of the navigation state as time passes. The short term accuracy of the IMU is effectively combined with the long term accuracy of GPS to produce a navigation state without long term drift effects of inertial data or the noisy short-term variation of GPS data.

It should be appreciated that Kalman filtering is merely one practical way of implementing a stochastic alignment and flexure estimation algorithm, and that any suitable technique can be utilized in lieu of Kalman filtering to measure the static and dynamic alignment of the measurement IMUs relative to the reference IMU. For example a least squares technique can be employed instead of Kalman filtering.

Aeroelasticity measurement process 400 can resolve the wing twist and/or the wing deflection information from the corrected measurement solution (task 416) using suitable processing techniques. In the example embodiment, the aeroelasticity data is resolved from measurement and reference unit differencing of position, velocity, and attitude. The difference, at a 10 Hz rate, contains the effects of instrument inertial errors, timing errors, static and dynamic attitude difference and flexure. The stochastic alignment and flexure algorithm separates these out and estimates them, providing a correction to the measurement navigation state and the twist and flexure data that is desired. The wing twist/deflection data can then be displayed, saved, printed, or otherwise presented to an operator for review.

The reference navigation unit and the measurement navigation units for the example system described above navigate with respect to the earth (absolute position). An alternate embodiment, however, may employ measurement navigation units that track motion relative to the reference navigation unit. Thus, the navigation solution can be an absolute earth-relative solution as described above or a solution that tracks one point relative to another (reference) point whose absolute earth-relative position is unknown. In other words, for purposes of aeroelasticity measurement an absolute earth-relative solution is not essential.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for measuring aeroelasticity of an aircraft component, said method comprising:
   obtaining reference navigation data for a reference location on an aircraft;
   generating a reference navigation solution based upon said reference navigation data;
   obtaining measurement navigation data for at least one measurement location on said aircraft;
   generating a measurement navigation solution based upon said measurement navigation data;
   performing stochastic alignment and flexure estimation on said reference navigation solution and said measurement navigation solution to obtain a corrected measurement solution that indicates aeroelasticity of said at least one measurement location relative to said reference location; and
   providing wing twist/deflection information to an operator, the wing twist/deflection information being derived from the corrected measurement solution.

2. A method according to claim 1, further comprising:
   obtaining global positioning system ("GPS") data for said reference location; and
   processing said reference navigation data and said GPS data to generate said reference navigation solution.

3. A method according to claim 1, wherein said reference location is a location in the body of said aircraft, and said at least one measurement location is at least one location in the wings of said aircraft.

4. A method according to claim 3, further comprising resolving wing twist from said corrected measurement solution.

5. A method according to claim 3, further comprising resolving wing deflection from said corrected measurement solution.

6. A method according to claim 1, wherein performing stochastic alignment and flexure estimation comprises applying Kalman filtering to said reference navigation solution and said measurement navigation solution.

7. A method according to claim 1, wherein:
   said reference navigation data is obtained at a first rate;
   said reference navigation solution is generated at said first rate;
   said measurement navigation data is obtained at said first rate;
   said measurement navigation solution is generated at said first rate; and
   stochastic alignment and flexure estimation is performed on said reference navigation solution and said measurement navigation solution at a second rate.

8. A method according to claim 7, wherein said second rate is less than said first rate.

9. A method according to claim 1, wherein:
   said reference navigation data comprises measured angle change and measured velocity change for a plurality of axes; and
   said measurement navigation data comprises measured angle change and measured velocity change for a plurality of axes.

10. A method according to claim 1, wherein:
    said reference navigation solution comprises position, velocity, and attitude data for said reference location; and
    said measurement navigation solution comprises position, velocity, and attitude data for said at least one measurement location.

11. A method according to claim 1, wherein said corrected measurement solution represents a difference between said reference navigation solution and said measurement navigation solution.

12. A system for measuring elasticity of a component, said system comprising:
    a reference navigation unit configured to generate reference navigation data for a reference location on the component;
    a measurement navigation unit configured to generate measurement navigation data for a measurement location on the component; and
    a processing unit, coupled to said reference navigation unit and to said measurement navigation unit, said processing unit being configured to generate a reference navigation solution based upon said reference navigation data, to generate a measurement navigation solution based upon said measurement navigation data, to perform stochastic alignment and flexure estimation on said reference navigation solution and said measurement navigation solution to obtain a corrected measurement solution that indicates aeroelasticity of said measurement location relative to said reference location, and to provide wing twist/deflection information to an operator, the wing twist/deflection information being derived from the corrected measurement solution.

13. A system according to claim 12, further comprising a global positioning system ("GPS") receiver configured to provide GPS data for said reference location, wherein said processing unit is configured to process said reference navigation data and said GPS data to generate said reference navigation solution.

14. A system according to claim 12, wherein:
    said reference navigation unit is configured to generate said reference navigation data at a first rate;
    said processing unit is configured to generate said reference navigation solution at said first rate;
    said measurement navigation unit is configured to generate said measurement navigation data at said first rate;
    said processing unit is configured to generate said measurement navigation solution at said first rate; and
    said processing unit is configured to generate said corrected measurement solution at a second rate.

15. A system according to claim 12, wherein:
    said reference navigation data comprises measured angle change and measured velocity change for a plurality of axes; and said measurement navigation data comprises measured angle change and measured velocity change for a plurality of axes.

16. A system according to claim 12, wherein:
said reference navigation solution comprises position, velocity, and attitude data for said reference location; and
said measurement navigation solution comprises position, velocity, and attitude data for said measurement location.

17. A system according to claim 12, wherein said corrected measurement solution represents a difference between said reference navigation solution and said measurement navigation solution.

18. A system according to claim 12, said reference navigation unit comprising a first inertial measurement unit, and said measurement navigation unit comprising a second inertial measurement unit.

19. A system for measuring aeroelasticity of an aircraft component, said system comprising a processing unit configured to:
obtain reference navigation data for a reference location on an aircraft;
generate a reference navigation solution based upon said reference navigation data;
obtain measurement navigation data for at least one measurement location on said aircraft;
generate a measurement navigation solution based upon said measurement navigation data;
perform stochastic alignment and flexure estimation on said reference navigation solution and said measurement navigation solution to obtain a corrected measurement solution that indicates aeroelasticity of said at least one measurement location relative to said reference location; and
provide wing twist/deflection information to an operator, the wing twist/deflection information being derived from the corrected measurement solution.

20. A system according to claim 19, further comprising:
a reference navigation unit coupled to said processing unit, said reference navigation unit being configured to generate said reference navigation data; and
a measurement navigation unit coupled to said processing unit, said measurement navigation unit being configured to generate said measurement navigation data.

21. A system according to claim 19, further comprising a global positioning system ("GPS") receiver configured to provide GPS data for said reference location, wherein said processing unit is configured to process said reference navigation data and said GPS data to generate said reference navigation solution.

* * * * *